(12) United States Patent
Li et al.

(10) Patent No.: US 10,236,758 B2
(45) Date of Patent: Mar. 19, 2019

(54) SINGLE PHASE PERMANENT MAGNET MOTOR AND STATOR CORE THEREOF

(71) Applicant: JOHNSON ELECTRIC INTERNATIONAL AG, Murten (CH)

(72) Inventors: Yue Li, Hong Kong (CN); Chui You Zhou, Shenzhen (CN); Yong Wang, Shenzhen (CN); Yong Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 218 days.

(21) Appl. No.: 15/252,644

(22) Filed: Aug. 31, 2016

(65) Prior Publication Data

US 2017/0063174 A1 Mar. 2, 2017

(30) Foreign Application Priority Data

Sep. 1, 2015 (CN) .......................... 2015 1 0553310

(51) Int. Cl.
*H02K 21/18* (2006.01)
*H02K 1/14* (2006.01)
*H02K 1/27* (2006.01)

(52) U.S. Cl.
CPC ........... *H02K 21/185* (2013.01); *H02K 1/143* (2013.01); *H02K 1/2733* (2013.01)

(58) Field of Classification Search
CPC ...... H02K 21/185; H02K 21/18; H02K 21/20; H02K 1/143; H02K 1/2733; H02K 1/141
USPC .............. 310/156.01, 216.015–216.016, 310/216.023–216.029, 216.031–216.039, 310/216.091–219.097
See application file for complete search history.

(56) References Cited

U.S. PATENT DOCUMENTS

| | | | | |
|---|---|---|---|---|
| 4,473,766 A | * | 9/1984 | Obergfell | H02K 37/16 310/216.036 |
| 5,927,249 A | * | 7/1999 | Ackermann | H02K 26/00 310/216.033 |
| 6,069,428 A | * | 5/2000 | Nelson | H02K 5/15 310/401 |
| 2004/0041492 A1 | * | 3/2004 | Ishikawa | H02K 1/143 310/419 |
| 2008/0303369 A1 | * | 12/2008 | Ionel | H02K 1/143 310/172 |
| 2017/0063178 A1 | * | 3/2017 | Li | H02K 1/141 |
| 2017/0063209 A1 | * | 3/2017 | Li | H02K 21/185 |

* cited by examiner

*Primary Examiner* — Michael Andrews
(74) *Attorney, Agent, or Firm* — Muncy, Geissler, Olds & Lowe, P.C.

(57) ABSTRACT

The present invention provides a stator core comprising an end portion and a pole arm extending from the end portion. The pole arm includes two spaced connecting arms and two pole claws respectively formed at distal ends of the connecting arms. The two pole claws define a space for receiving a rotor therein. The pole claws surround the space and form an arc pole surface. The arc pole surface forms a discontinuity opening along a circumferential direction. The discontinuity opening faces a spacing between the connecting arms and has a width changed along an axial direction.

17 Claims, 6 Drawing Sheets

SINGLE PHASE PERMANENT MAGNET MOTOR AND STATOR CORE THEREOF

CROSS REFERENCE TO RELATED APPLICATIONS

This non-provisional patent application claims priority under 35 U.S.C. § 119(a) from Patent Application No. 201510553310.0 filed in The People's Republic of China on 1 Sep. 2015.

FIELD OF THE INVENTION

The present invention relates to single phase motors, and in particular to a stator core of a single phase permanent magnet motor.

BACKGROUND OF THE INVENTION

A single phase permanent magnet motor usually consists of a stator core, stator windings, and a permanent magnet rotor. The stator core is generally U-shaped, including two spaced pole arms. A pole claw is formed at a distal end of each pole arm. An inner wall surface of each pole claw is inwardly recessed to form an arc pole surface. The windings are wound around the pole arms. The rotor is disposed between the two pole claws and confronts the arc pole surface. In this type of motor, the pole arms of the stator core are separated apart, with large openings formed between the two pole claws. The openings lead to a large cogging torque formed between the stator and the rotor, thus making the motor operation unstable and causing noise.

SUMMARY OF THE INVENTION

Thus, there is a desire for a single phase permanent magnet motor and a stator core thereof that can effectively improve the stability of the motor operation and reduce the noise.

In one aspect, the present invention provides a stator core includes an end portion and a pole arm extending from the end portion. The pole arm includes two spaced connecting arms and two pole claws respectively formed at distal ends of the connecting arms. The two pole claws defines a space for receiving a rotor therein. The pole claws surround the space and form an arc pole surface. The first arc pole surface forms a discontinuity opening along a circumferential direction, the discontinuity opening facing a spacing between the connecting arms and having a width changed along an axial direction.

Preferably, the discontinuity opening has a first width and a second width, the second width is less than the first width.

Preferably, the first width is substantially equal to the spacing between the connecting arms.

Preferably, the pole arm comprises a first pole arm and a second pole arm stacked with each other in the axial direction, the first pole arm comprises two first pole claws, the two first pole claws are separated apart to form a first opening, the second pole arm comprises two second pole claws, the two second pole claws are separated apart to form a second opening, and the first opening and the second opening cooperatively form the discontinuity opening.

Preferably, the second opening is axially aligned with the first opening, and a width of the second opening is less than a width of the first opening.

Preferably, the width of the first opening is substantially equal to a width of the spacing between the connecting arms.

Preferably, each second pole claw extends toward the other second pole claw to form a wall portion, and the wall portions of the two second pole claws form the second opening there between.

Preferably, there are one said first pole arm and two said second pole arms, and said first pole arm is sandwiched between said two second pole arms.

Preferably, there are two said first pole arms and one said second pole arm, and said second pole arm is sandwiched between said two first pole arms.

Preferably, there are a plurality of said first pole arms and a plurality of said second pole arms alternatively stacked along the axial direction.

Preferably, each of the end portion, the first pole arm and the second pole arm are formed by stacking a plurality of laminations and are mechanically connected with each other.

Preferably, one of the first pole arm and the end portion forms a locking groove, and the other of the first pole arm and the end portion forms a locking block; one of the second pole arm and the end portion forms a locking groove, and the other of the second pole arm and the end portion forms a locking block; each locking block is engaged in one corresponding locking groove to interconnect the first pole arm, the second pole arm and the end portion Preferably, the arc pole surface is inwardly recessed to form two startup grooves, and the two startup grooves are offset from a central axis of the pole claws.

In another aspect, the present invention provides a stator core including an end portion, a first pole arm extending from the end portion, and a second pole arm stacked with the first pole arm in an axial direction. The first pole arm includes two first pole claws. The two first pole claws are separated apart to form a first opening. The second pole arm stacked with the first pole arm in an axial direction, the second pole arm comprising two second pole claws, the two second pole claws being separated apart to form a second opening. A width of the second opening is less than a width of the first opening.

In another aspect, the present invention provides a single phase permanent magnet motor including a stator core, windings wound around the stator core, and a permanent magnet rotor rotatable relative to a stator core. A stator core includes an end portion, a first pole arm extending from the end portion, and a second pole arm stacked with the first pole arm in an axial direction. The first pole arm includes two first pole claws. The two first pole claws are separated apart to form a first opening. The second pole arm stacked with the first pole arm in an axial direction, the second pole arm comprising two second pole claws, the two second pole claws being separated apart to form a second opening. A width of the second opening is less than a width of the first opening. The rotor is disposed in the space in the two pole claws, and the arc pole surface surrounds the rotor with an air gap formed between the arc pole surface and the rotor.

Preferably, a minimum circumferential width of the discontinuity opening of the arc pole surface is less than four times of a width of the air gap between the pole claws and the rotor.

DETAILED DESCRIPTION OF THE
PREFERRED EMBODIMENTS

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

Figure 1:
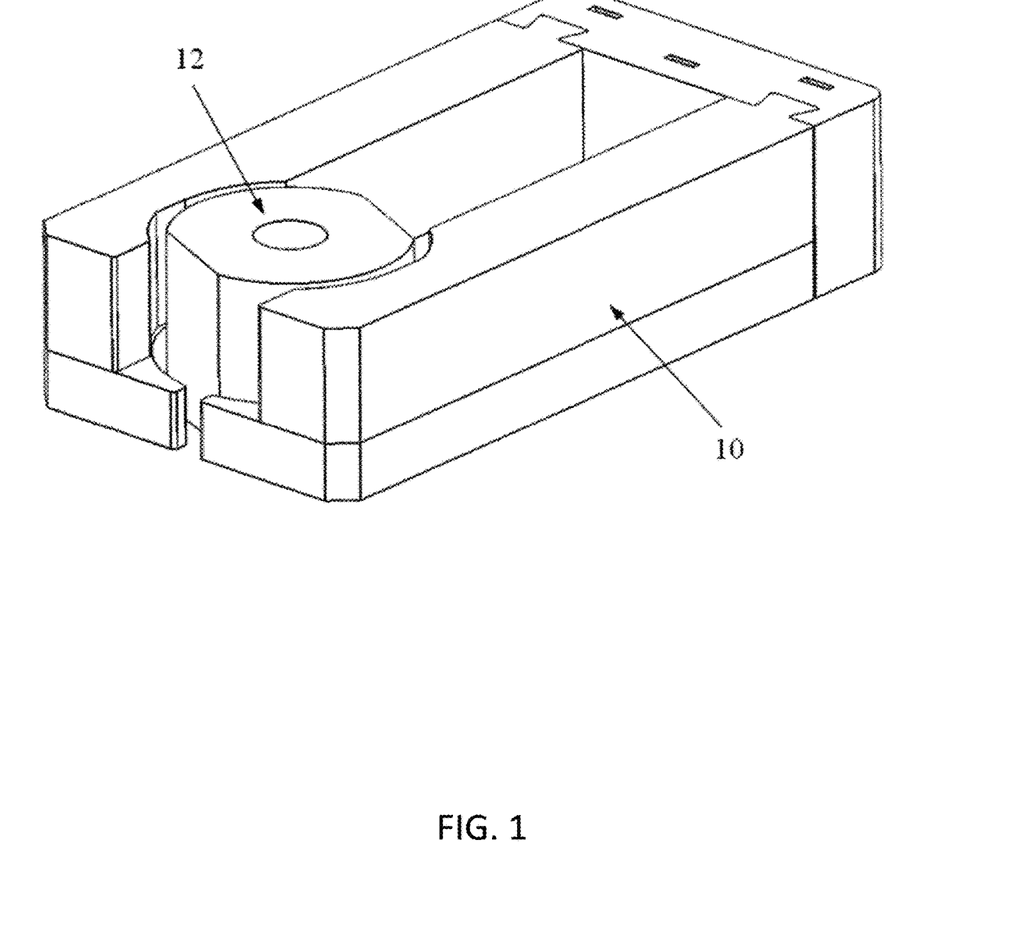
FIG. 1 illustrates a single phase permanent magnet motor according to one embodiment of the present invention.
Figure 2:
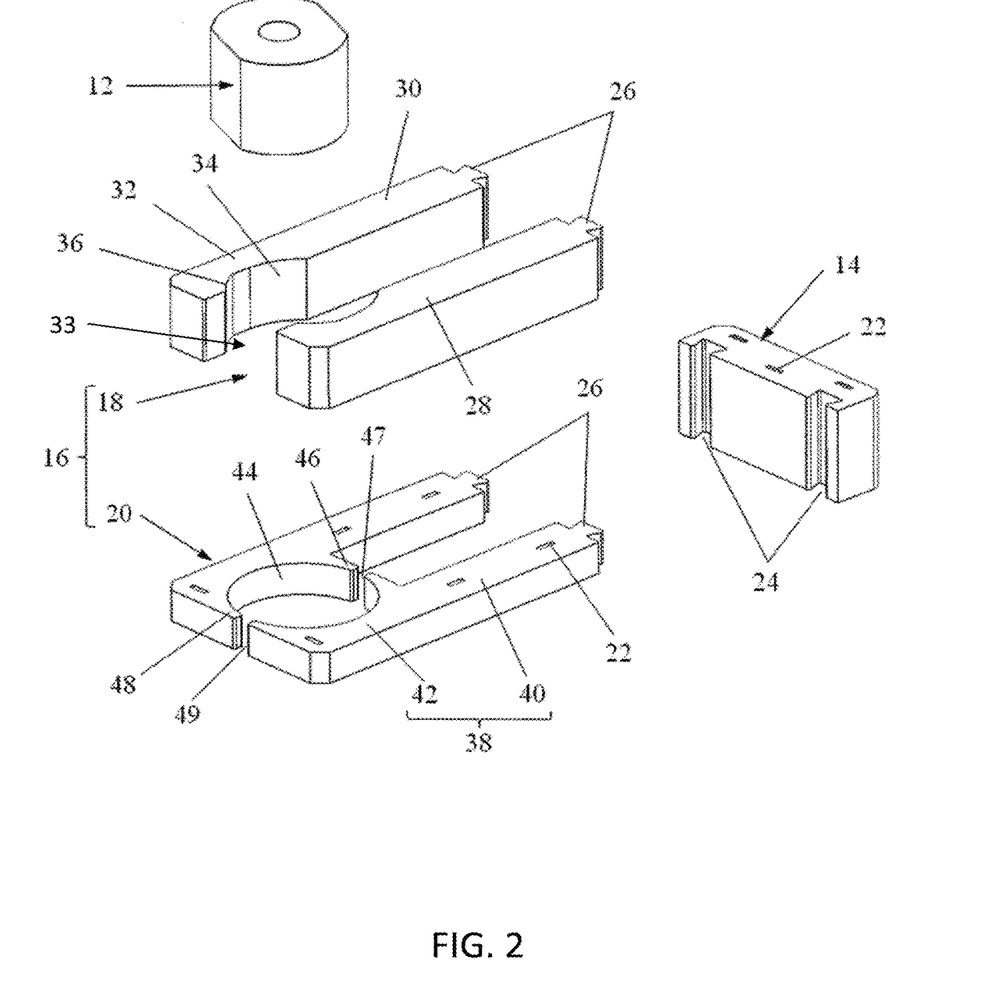
FIG. 2 is an exploded view of the motor of FIG. 1.

FIG. 1 and FIG. 2 illustrate a single phase permanent magnet motor according to one embodiment of the present invention. The motor includes a stator core 10, windings (not shown) wound around the stator core 10, and a permanent magnet rotor 12 rotatably disposed in the stator core 10. In the figures, for the sake of clearly showing the structure and features of the stator core 10 of the motor of the present invention, some parts of the motor, such as the windings, a control circuit for controlling the current of the windings, a motor housing or the like, are not shown, which can be constructed as in a known single phase permanent magnet motor. A rotary shaft may fixedly pass through the permanent magnet rotor 12 for connecting with a load. Upon the windings being energized, the stator core 10 is polarized which interacts with the magnetic field of the permanent magnet rotor 12 to push the permanent magnet rotor 12 to rotate, which in turn drives the load to operation.

The stator core 10 may be made from a soft magnetic material such as ferrite. Preferably, in the present embodiment, the stator core 10 is a U-shaped stator core including an end portion 14 and a pole arm 16 perpendicularly extending outwardly from the end portion 14. In this embodiment, the pole arm 16 includes at least a first pole arm 18 and a second pole arm 20. The first pole arm 18 and the second pole arm 20 are stacked with each other in an axial direction of the rotor 12 and are connected to the same side of the end portion 14. In this embodiment, the end portion 14, the first pole arm 18 and the second pole arm 20 are separately formed and then are connected together through mechanical connections. As such, the winding process can be completed before the first pole arm 18 and the second pole arm 20 are connected to the end portion 14, which makes the winding process easier and more convenient.

Preferably, each of the end portion 14, first pole arm 18 and second pole arm 20 is made by stacking a plurality of laminations such as silicon steel sheets. The figures only show the overall shapes of the end portion 14, first pole arm 18 and second pole arm 20 after the laminations are stacked, without showing specific structures of the multiple stacked layers. For facilitating the assembly of the laminations, each lamination is formed with a corresponding assembly hole 22. In this embodiment, the assembly hole 22 is a recessed blind hole and the lamination has a protrusion corresponding to the blind hole. During stacking the laminations, the protrusion of one lamination is engaged in the assembly hole of an adjacent lamination so as to form a mechanical connection there between. The end portion 14, the first pole arm 18 and the second pole arm 20 are respectively formed by the methods.

In this embodiment, the end portion 14 forms two locking grooves 24 at locations adjacent two sides thereof. The locking grooves 24 extend through the end portion 14 along the axial direction. The pole arm 16 including the first pole arm 18 and the second pole arm 20 forms locking blocks 26 corresponding to the locking grooves 24. The locking blocks 26 are inserted into the locking grooves 24 along the axial direction to connect the pole arm 16 with the end portion 14, thus forming the stator core 10. Preferably, the locking block 26 is dovetail shaped and the locking groove 24 has a shape matching the locking block 26, so that the connection between the locking block 26 and the locking groove 24 is strengthened, to avoid disengagement there between. In another embodiment, the locking grooves 24 may be formed in the first pole arm 18 and the second pole arm 20, the locking blocks 26 are correspondingly formed on the end portion 14, and the end portion 14, the first pole arm 18 and the second pole arm are connected together to form the stator core 10.

The first pole arm 18 includes two separate arm portions 28. The two arm portions 28 have substantially the same construction and, are spaced apart and disposed in parallel with each other. Each arm portion 28 is elongated, including a first connecting arm 30 and a first pole claw 32 formed at a distal end of the first connecting arm 30 away from the end portion 14. An end face of the other distal end of the first connecting arm 30 facing the end portion 14 projects outwardly to form the locking block 26 for connecting with the locking groove 24 of the end portion 14. The first pole claws 32 of the two arm portions 28 are opposed to and spaced from each other, and cooperatively define a receiving space for receiving the rotor 12 there between. Opposed inner wall surfaces of the two first pole claws 32 are recessed to form a first arc pole surface 34. The first arc pole surface 34 confronts and is spaced from an outer surface of the rotor 12, with an air gap formed between the first arc pole surface 34 and the rotor 12.

Because the two first pole claws 32 of the first pole arm 18 are separated from each other, and distal ends of the two first pole claws 32 are spaced apart to define a first opening 33, the first arc pole surface 34 is discontinuous in a circumferential direction. A width of the discontinuity in the first arc pole surfaces 34, i.e. a width of the opening 33, is substantially equal to a distance between the first connecting arms 30. Because the first arc pole surface 34 is discontinuous along the circumferential direction and the width of the discontinuity is large, a large magnetic reluctance is formed at the discontinued area, which avoids magnetic leakage and hence enhances the efficiency of the motor. On the other hand, however, a large cogging torque is formed at the discontinued area, which affects the rotation of the rotor 12 and causes noise.

Preferably, an inwardly-recessed startup groove 36 is formed in the first arc pole surface 34. The startup groove 36 is offset from a central axis X (FIG. 3) of the first pole claw 32 by an angle. In this embodiment, there are two startup grooves 36 that are disposed symmetrically with respect to the rotation axis of the rotor 12. One startup groove 36 extends inwardly along a clockwise direction from an end of one corresponding first pole claw 32 remote from the first connecting arm 30 with a depth gradually increasing, and the other start up groove 36 extends inwardly along an anti-clockwise direction from an end of the corresponding first pole claw 32 adjacent to the first connecting arm with a depth gradually increasing. The presence of the startup grooves 36 makes the air gap between the first arc pole surface 34 and the rotor 12 uneven, such that when the motor is powered off and stops rotation, a pole axis of the rotor 12, i.e., an axis passing through the centers of the magnetic poles, is offset from the central axis X of the first pole claw 32 by an angle, such that the rotor is avoided from stopping at a dead point, thereby ensuring that the motor can be successfully started upon being energized.

The second pole arm 20 also includes two separate arm portions 38. The two arm portions 38 have substantially the same construction and, are spaced apart and disposed in parallel with each other. Each arm portion 38 is elongated, including a second connecting arm 40 and a second pole claw 42 formed at a distal end of the second connecting arm 40 away from the end portion 14. An end face of the other distal end of the first connecting arm 40 facing the end portion 14 projects outwardly to form the locking block 26 for connecting with the locking groove 24 of the end portion 14. The first pole claws 42 of the two arm portions 38 are opposed to and spaced from each other, and cooperatively define a receiving space for receiving the rotor 12. Opposed inner wall surfaces of the two first pole claws 42 are recessed to form a second arc pole surface 44. The second arc pole surface 44 confronts and is spaced from the outer surface of the rotor 12, with an air gap formed between the second arc pole surface 44 and the rotor 12.

In this embodiment, each second pole claw 42 is generally C-shaped, with two circumferential sides of which project laterally outwardly relative to the second connecting arm 40 to form inner and outer wall portions 46, 48. The wall portions 46, 48 are generally parallel to the end portion 14 and disposed in the spacing between the two second connecting arms 40. Preferably, an extending length of the wall portions 46, 48 is less than a half of the spacing between the two second connecting arms 30. As such, after the arm portions 38 are joined, the two inner wall portions 46 of the two second pole claws 34 are opposed to each other, with distal ends there of forming a second opening 47 there between; the two outer wall portions 48 are opposed to each other, with distal ends there of likewise form a second opening 49 there between. Preferably, the two second openings 47, 49 are aligned with a middle of the spacing between the two second connecting arms 40. The second openings 47, 49 have a width less than the spacing between the two second connecting arms 40, and the width of the first opening 33.

Because the two second pole claws 42 of the second pole arm 20 are separated apart, the second arc pole surface 44 is discontinuous in the circumferential direction. In addition, because the wall portions 46, 48 of the two second pole claws 42 extend towards each other, the width of the discontinuity in the second arc pole surface in the circumferential direction, i.e. the circumferential width of the openings 47, 49 is far less than the distance between the second connecting arms 40. As such, although the second arc pole surface 44 is discontinuous in the circumferential direction, the width of the discontinuity is very small, which reduces the cogging torque of the motor and ensures stable rotation of the rotor 12 while avoiding the magnetic leakage.

Preferably, the width of the discontinuity, i.e., the second opening 47, 49 in the second arc pole surface 44 in the circumferential direction is less than four times, more preferably two times, of the width of the air gap between the second arc pole surface 44 and the rotor 12. In addition, the two openings 47, 49 may have different widths, i.e. the first arc pole surface 44 can be discontinued at different locations along the circumferential direction with different widths. In this embodiment, a minimum width of the discontinuity in the second arc pole surface is about two times of the width of the air gap between the second arc pole surface 44 and the rotor 12, which can reduce the cogging torque while reducing the magnetic leakage as much as possible.

Figure 3:
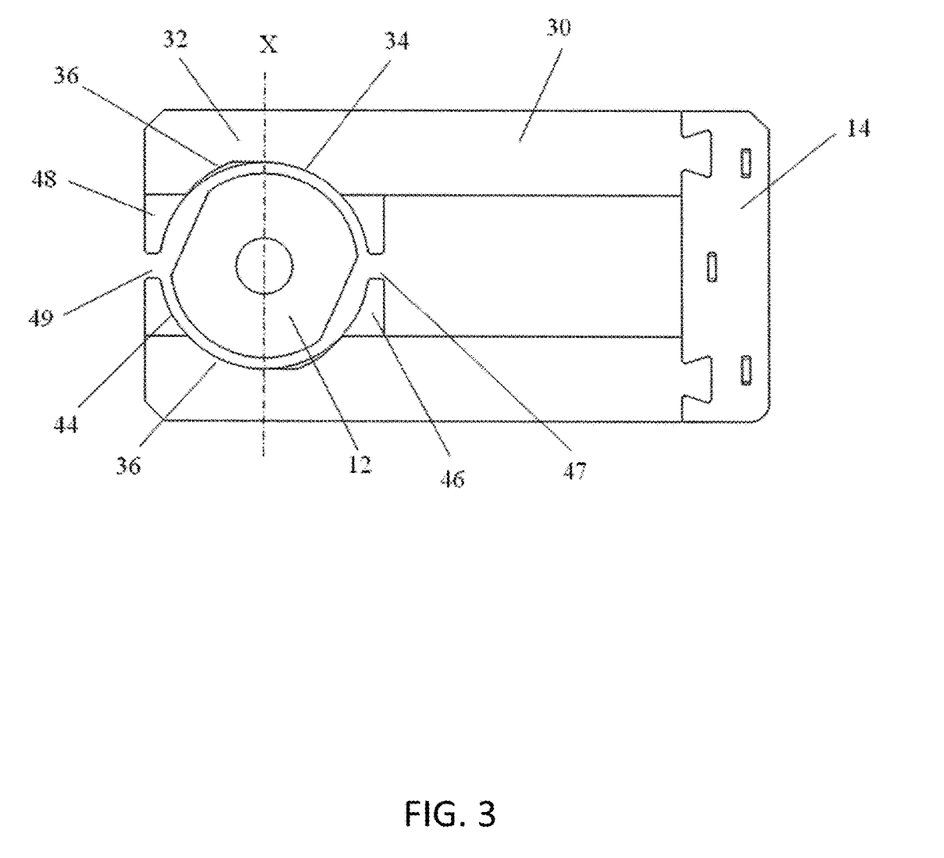
FIG. 3 is a top view of the motor of FIG. 1.
Figure 4:
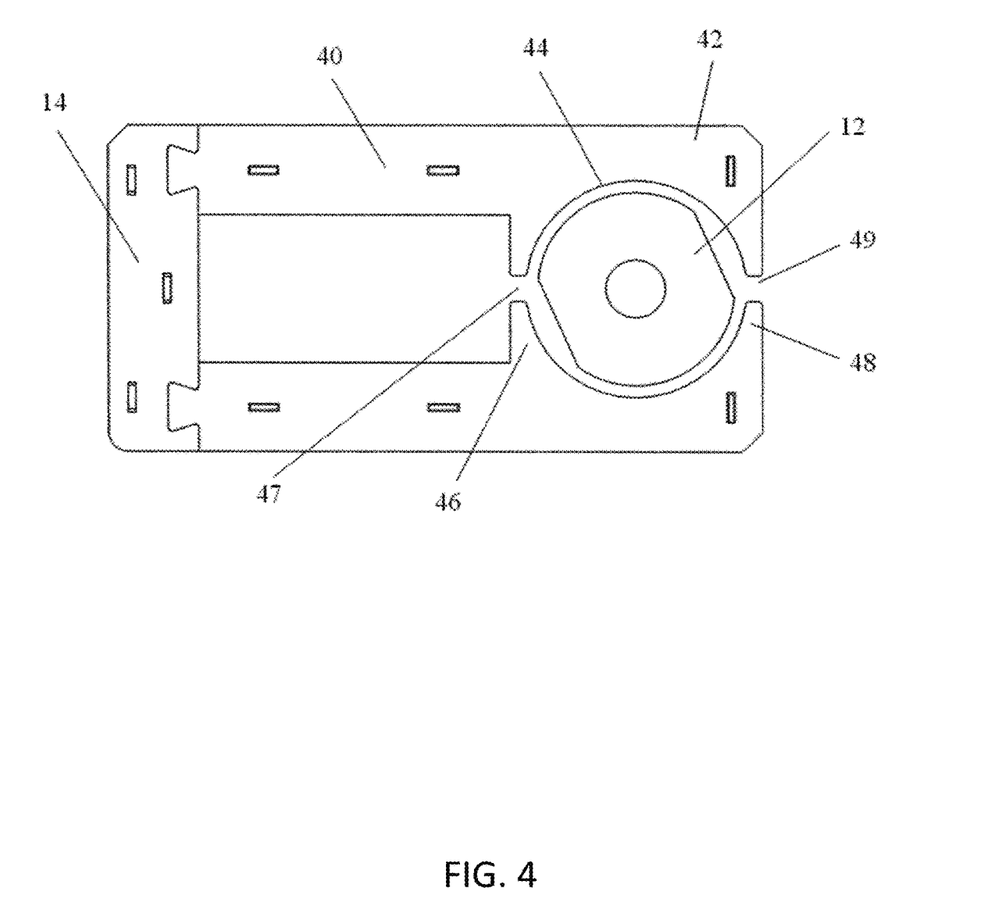
FIG. 4 is a bottom view of the motor of FIG. 1.

Referring to FIG. 3 and FIG. 4, the first pole arm 18 and the second pole arm 20 are stacked in the axial direction of the rotor 12, with each first connecting arm 30 stacked on one corresponding second connecting arm 40 to cooperatively from one connecting arm of the pole arm 16. In this embodiment, the two connecting arms of the pole arm 16 are spaced from and disposed in parallel with each other, with a winding space formed there between. The windings are wound around the two connecting arms. There are typically two windings connected in series. Each of the two first pole claws 32 is stacked with one second pole claw 42 to cooperatively form one pole claw of the pole arm 16 for interacting with the rotor 12. The first arc pole surface 34 and the second arc pole surface 44 are substantially coaxial, have substantially the same diameter, and cooperatively form an arc pole surface of the pole arm 16. The arc pole surface is generally cylindrical shaped which surrounds the rotor 12 with the air gap formed between the arc pole surface and the rotor 12.

The location of the discontinuity in the second arc pole surface 44 in the circumferential direction is axially aligned with the location of the discontinuity in the first arc pole surface 34 in the circumferential direction. That is, the second openings 47, 49 are respectively aligned with the first openings, and the whole arc pole surface is discontinuous in the circumferential direction. Because the width of the discontinuity in the second arc pole surface 44 is less than the width of the discontinuity in the first arc pole surface 34, the discontinuity opening of the whole arc pole surface has a stepped shape with changing widths. Specifically, the discontinuity in the first arc pole surface 34 has a larger width which is substantially equal to the distance between the winding portions; the discontinuity in the second arc pole surface 44 has a smaller width which is far less than the distance between the winding portions. As such, the width of the discontinuity in at least part of the arc pole surface is significantly reduced, which effectively reduces the noise and enhances the overall performance of the motor, while substantially not affecting the motor rotation.

In addition, the arc pole surface and the rotor 12 form an uneven air gap at the area of the startup groove 36, and form an even air gap at the area without the startup groove. In the above embodiment, the startup grooves 36 are formed in the first arc pole surfaces 34 only. In some other embodiments, the startup grooves 36 can be formed in the second arc pole surfaces 44, or formed in both of the first and second arc pole surfaces 34, 44. It should be understood that a driving circuit may be designed to suit particular requirements on the startup direction of the motor. In addition, the startup groove 36 may be modified in various length and depth to meet different requirements and should not be limited to the particular constructions as illustrated.

Figure 5:
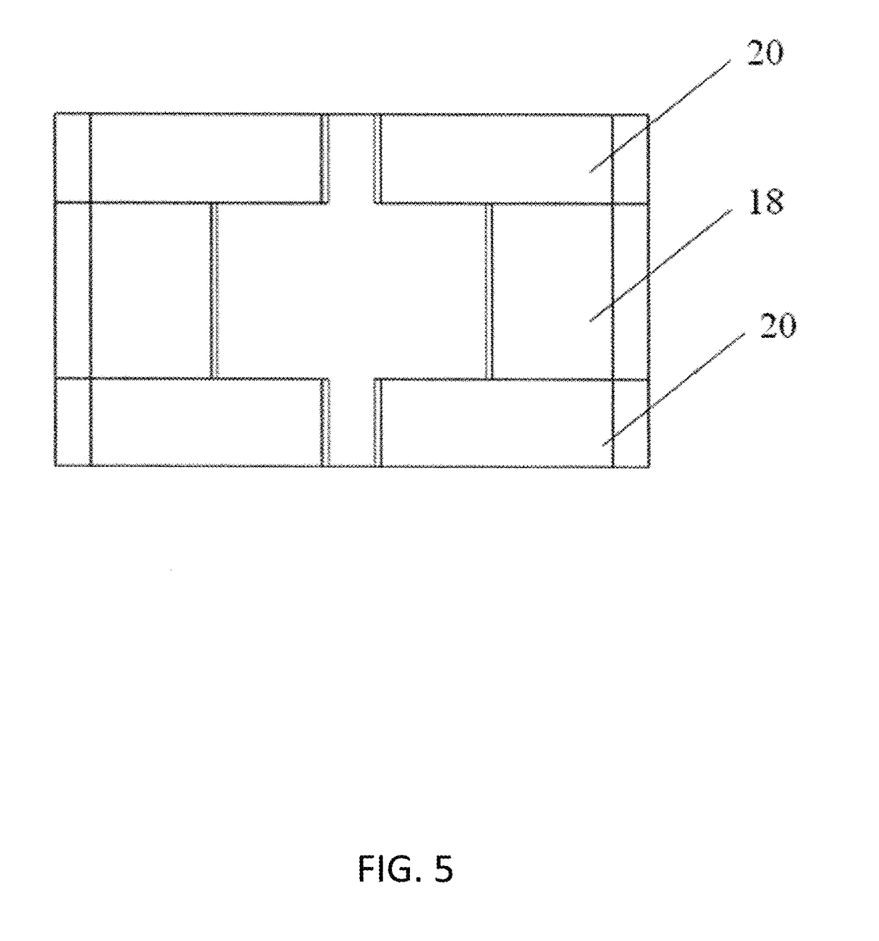
FIG. 5 illustrates a stator core of a single phase permanent magnet motor according to a second embodiment.
Figure 6:
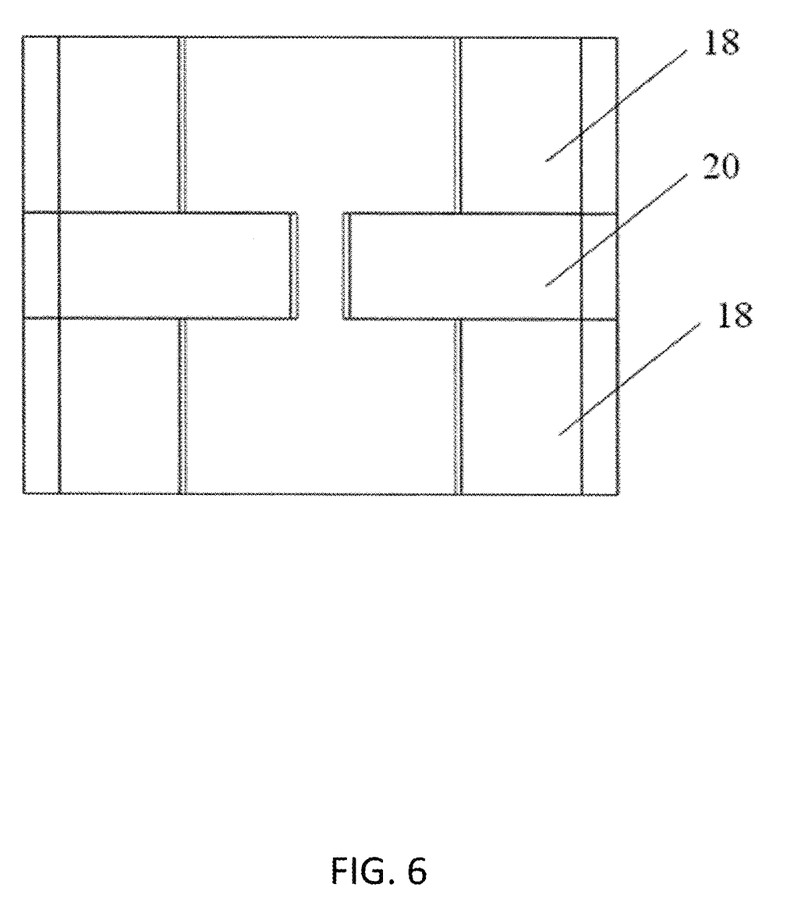
FIG. 6 illustrates a stator core of a single phase permanent magnet motor according to a third embodiment.

In the above embodiment, a single first pole arm 18 is combined with a single second pole arm 20 to form the stator core 10. In some other embodiments, the first pole arm 18 and second pole arm 20 may be combined in different patterns. Referring to FIG. 5, a single first pole arm 18 may be combined with two second pole arms 20, with the first pole arm 18 sandwiched between the two second pole arms 20. Alternatively, referring to FIG. 6, a single second pole arm 20 may be combined with two first pole arms 18, with the second pole arm 20 sandwiched between the two first pole arms 18. In another alternative embodiment, multiple first pole arms 18 and multiple second pole arms 20 are alternatively stacked.

Although the invention is described with reference to one or more preferred embodiments, it should be appreciated by those skilled in the art that various modifications are possible. Therefore, the scope of the invention is to be determined by reference to the claims that follow.

The invention claimed is:

1. A stator core comprising:
   an end portion; and
   a pole arm extending from the end portion, the pole arm comprising two spaced connecting arms and two pole claws respectively formed at distal ends of the connecting arms, the two pole claws defining a space for receiving a rotor therein, the pole claws surrounding the space and forming an arc pole surface, the arc pole surface forming a discontinuity opening along a circumferential direction, the discontinuity opening facing a spacing between the connecting arms and having a width changed along an axial direction, wherein a minimum width of the discontinuity opening is greater than zero.

2. The stator core of claim 1, wherein the discontinuity opening has a first width and a second width, the second width is less than the first width.

3. The stator core of claim 1, wherein the first width is substantially equal to the spacing between the connecting arms.

4. The stator core of claim 1, wherein the pole arm comprises a first pole arm and a second pole arm stacked with each other in the axial direction, the first pole arm comprises two first pole claws, the two first pole claws are separated apart to form a first opening, the second pole arm comprises two second pole claws, the two second pole claws are separated apart to form a second opening, and the first opening and the second opening cooperatively form the discontinuity opening.

5. The stator core of claim 4, wherein the second opening is axially aligned with the first opening, and a width of the second opening is less than a width of the first opening.

6. The stator core of claim 4, wherein the width of the first opening is substantially equal to a width of the spacing between the connecting arms.

7. The stator core of claim 4, wherein each second pole claw extends toward the other second pole claw to form a wall portion, and the wall portions of the two second pole claws form the second opening there between.

8. The stator core of claim 4, wherein there are one said first pole arm and two said second pole arms, and said first pole arm is sandwiched between said two second pole arms.

9. The stator core of claim 4, wherein there are two said first pole arms and one said second pole arm, and said second pole arm is sandwiched between said two first pole arms.

10. The stator core of claim 4, wherein there are a plurality of said first pole arms and a plurality of said second pole arms alternatively stacked along the axial direction.

11. The stator core of claim 4, wherein each of the end portion, the first pole arm and the second pole arm are formed by stacking a plurality of laminations and are mechanically connected with each other.

12. The stator core of claim 4, wherein one of the first pole arm and the end portion forms a locking groove, and the other of the first pole arm and the end portion forms a locking block; one of the second pole arm and the end portion forms a locking groove, and the other of the second pole arm and the end portion forms a locking block; each locking block is engaged in one corresponding locking groove to interconnect the first pole arm, the second pole arm and the end portion.

13. The stator core of claim 1, wherein the arc pole surface is inwardly recessed to form two startup grooves, and the two startup grooves are offset from a central axis of the pole claws.

14. A single phase permanent magnet motor comprising:
    a stator core according to claim 1;
    windings wound around the pole arm of the stator core, and
    a permanent magnet rotor rotatably disposed in the space in the two pole claws, the pole claws of the stator core surrounding the rotor with an air gap formed between the pole claws and the rotor.

15. The single phase permanent magnet motor of claim 14, wherein a minimum circumferential width of the discontinuity opening of the arc pole surface is less than four times of a width of the air gap between the pole claws and the rotor.

16. A stator core comprising:
    an end portion;
    a first pole arm extending from the end portion, the first pole arm comprising two first pole claws, the two first pole claws being separated apart to form a first opening; and
    a second pole arm stacked with the first pole arm in an axial direction, the second pole arm comprising two second pole claws, the two second pole claws being separated apart to form a second opening,
    wherein a width of the second opening is less than a width of the first opening.

17. The stator core of claim 16, wherein the first pole arm further comprises two first connecting arms respectively connected between the two first pole claws and the end portion, the two first connecting arms are spaced apart, the width of the first opening is substantially equal to a spacing between the two first connecting arms.

* * * * *